United States Patent [19]

Akiyama

[11] Patent Number: 4,928,166
[45] Date of Patent: May 22, 1990

[54] APPARATUS FOR SUPPRESSING NOISES IN A VIDEO SIGNAL

[75] Inventor: Toru Akiyama, Tokorozawa, Japan
[73] Assignee: Pioneer Electronic Corporation, Tokyo, Japan
[21] Appl. No.: 215,329
[22] Filed: Jul. 5, 1988
[30] Foreign Application Priority Data
  Oct. 30, 1987 [JP] Japan ............... 62-275437
[51] Int. Cl.⁵ .................... H04N 9/87
[52] U.S. Cl. .................. 358/36; 358/38
[58] Field of Search ........... 358/36, 315, 38
[56] References Cited

U.S. PATENT DOCUMENTS

| | | | |
|---|---|---|---|
| 4,667,225 | 5/1987 | Kanda | 358/36 |
| 4,672,429 | 6/1987 | Faroudja et al. | 358/36 |
| 4,709,269 | 11/1987 | Ozaki | 358/167 |
| 4,779,133 | 10/1988 | Sugimori et al. | 358/167 |
| 4,802,016 | 1/1989 | Kaneko | 358/315 |

Primary Examiner—James J. Groody
Assistant Examiner—Robert M. Bauer
Attorney, Agent, or Firm—Foley & Lardner, Schwartz, Jeffery, Schwaab, Mack, Blumenthal & Evans

[57] ABSTRACT

An apparatus for suppressing noises in a color video signal is constructed to extract a frequency band component of the color video signal, to limit the amplitude of the extracted frequency band component, and to subtract the component, which is limited in amplitude, from the color video signal. Thus, a beat component such as a beat component generated by the interference between the main carrier signal and the color carrier signal of a recording video signal is removed from a video signal obtained after demodulation.

6 Claims, 2 Drawing Sheets

APPARATUS FOR SUPPRESSING NOISES IN A VIDEO SIGNAL

BACKGROUND OF THE INVENTION

1. Field of the Invention

The present invention relates to an apparatus for suppressing noises in a video signal.

2. Description of Background Information

Recently, there has been proposed a wide band video disk (simply referred to as SLD hereinafter) on which is recorded a recording signal from which FM audio carrier signals (of 2.3 MHz and 2.8 MHz) of ordinary video disks (simply referred to as LDs hereinafter) are removed in order to improve the horizontal resolution of the video disk, and a high frequency part of the color composite video signal (simply referred to as the video signal) is expanded, upon recording, into the frequency band remaining unused after the removal of the audio carrier signals.

With this method, the signal bandwidth of the recording video signal can be expanded from conventional 4.2 MHz to the extent of 6 MHz.

In the case of the SLD, if there is any factor generating distortions in the optical reading system such as the formation of pits, or in the signal transmission path such as in the head amplifier, the demodulated video signal which is retrieved by the playing apparatus will be degraded by a beat disturbance. Moreover, there is a tendency for the beat disturbance to become more noticeable with color pictures in which the signal spectrum is more concentrated as compared with monochromatic pictures.

This point will be explained with reference to the accompanying drawings.

FIG. 4 shows a signal spectrum of a radio frequency (simply referred to as RF) signal (FM modulation signal) read from an SLD by means of a pickup of a conventional arrangement, under a condition that a beat disturbance is generated in a color picture. As illustrated, upper and lower sideband components ($\omega_c \pm \omega sc$) of a color subcarrier signal are present at frequencies spaced from the frequency of a main carrier $\omega_c$ by $\pm\omega\omega_{sc}$. Moreover, beat components due to the distortion are generated as frequency components $\omega_{sc}$ and ($2\omega_c - \omega_{sc}$).

FIG. 5 shows a frequency relationship between the color subcarrier signal $\omega_{sc}$ and the beat component ($\omega_c - \omega_{sc}$) when the RF signal shown in FIG. 4 is demodulated by an FM demodulation process. The beat component is generated as a component ($\omega_c - \omega_{sc}$) above the color subcarrier signal $\omega_{sc}$. Since the frequency of the main carrier generally ranges from 8.1 MHz to 9.3 MHz, the frequency of the beat component ($\omega_c$ 1 $-sc$) ranges from 4.52 MHz to 5.72 MHz when the frequency of the subcarrier signal is 3.58 MHz.

With conventional LDs, this beat component does not cause any problem because its frequency ranges outside the bandwidth (below 4.2 MHz) of the video signal. However, in the case of the SLD, the bandwidth of the video signal is as broad as 6 MHz, and the beat component will appear in the video signal bandwidth. Therefore, a problem arises such that a bar-pattern noise appears in the picture.

OBJECT AND SUMMARY OF THE INVENTION

An object of the present invention is therefore to provide an apparatus for suppressing noises in a video signal, which apparatus is capable of suppressing the above mentioned beat component.

In order to accomplish the above object, a noise suppressing apparatus according to the present invention comprises a signal extracting means for extracting a predetermined frequency component of a color video signal, an amplitude-limiting means for limiting in amplitude an output signal of the signal extracting means, and a subtracting means for subtracting an output signal of the amplitude-limiting means from the color video signal.

DETAILED DESCRIPTION OF A PREFERRED EMBODIMENT

Figure 1:
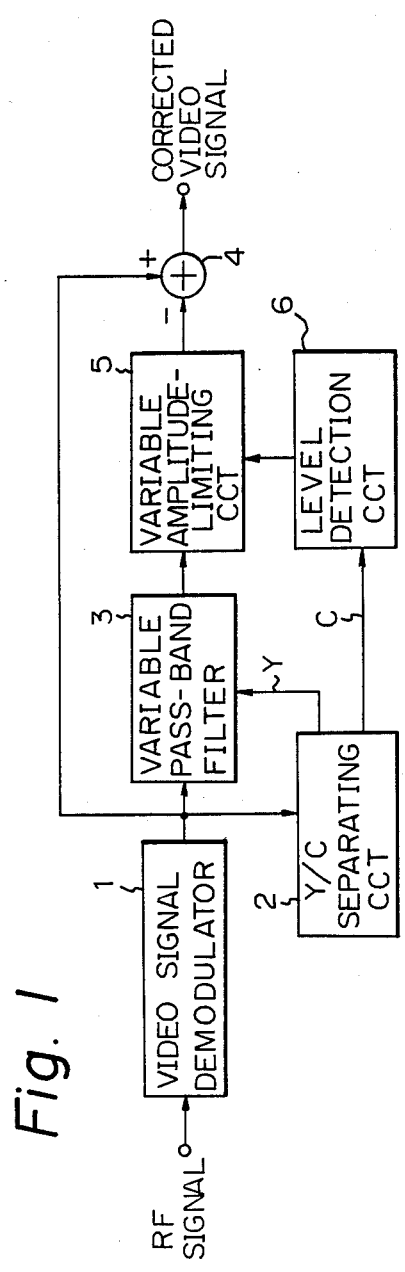
FIG. 1 is a block diagram showing an embodiment of the present invention.

As shown in FIG. 1, an RF signal modulated by an FM modulation and recorded on recording tracks of an SLD and read by means of a pickup having a conventional arrangement is supplied to a video signal demodulator 1, in which it is demodulated to a video signal. The demodulated video signal is supplied to a Y/C separating circuit 2 for separating a luminance signal Y and a chroma signal C, a variable pass-band filter 3 for extracting the beat components, and to one of two input terminals of a subtracting circuit 4. The Y/C separating circuit 2 is a known circuit constituted by a comb filter or a band-pass filter. The variable pass-band filter 3 is adapted to determine its frequency band for the passing signal in response to the level of the luminance signal $\gamma$. A high frequency component of the video signal extracted by the variable pass-band filter 3 is supplied to a variable amplitude-limiting circuit 5. The variable amplitude-limiting circuit 5 has an amplitude control input terminal to which a signal corresponding to the chroma signal C is supplied from a level detection circuit 6. The operation of the variable amplitudelimiting circuit 5 is such that it controls the amplitude of the signal passing through it to be equal to a limit value (saturation output) determined in accordance with the level of the chroma signal C when the amplitude of the passing signal exceeds the limit value. Therefore, this circuit controls the amplitude of the video signal component having a relatively high level so as to be constant, while allowing the beat component having a relatively low level to pass through it, thereby separating the beat component. This variable amplitude-limiting circuit 5 may be constructed, for example, by an arrangement such that the saturation characteristic of an active element such as a transistor is controlled in accordance with the control voltage, or the bias voltage of a diode limiter as controlled in accordance with the control voltage. The beat component separated by the variable amplitude-limiting circuit 5 is supplied to the other input terminal of the subtracting circuit 4. The subtracting circuit 4 operates to cancel the beat component contained in the video signal by the separated beat component, producing a corrected video signal in which the beat component is removed.

Figure 2:
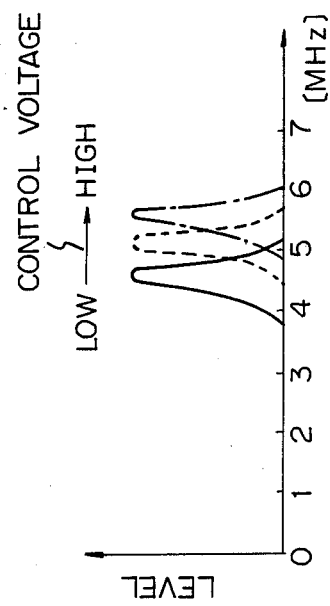
FIG. 2 is an explanatory diagram showing the characteristic of a variable pass-band filter used in the apparatus shown in FIG. 1.

The operation of the above circuit will be explained. At first, the RF signal includes a main carrier (its frequency is expressed as $\omega_c$) and a color subcarrier signal (its frequency is expressed as $\omega_{sc}$), and the frequency of the beat component is expressed as $\omega_c - \omega_{sc}$. The above mentioned main carrier signal is biased in frequency in response to the amplitude of the video signal which is to be recorded. In the NTSC system, the frequency of the color subcarrier signal $\omega_{sc}$ is fixed at 3.58 MHz, and the frequency of the beat component varies with the frequency of the main carrier signal. Since the luminance level of the video signals demodulated by the video demodulator 1 corresponds to the above mentioned main carrier frequency $\omega_c$, the beat component whose frequency is determined corresponding to the frequency of the main carrier signal is extracted by controlling the frequency pass-band of the variable pass-band filter 3. An example of the characteristic of the variable pass-band filter 3 is illustrated in FIG. 2. When the luminance level is low, the frequency pass-band is about 4.52 MHz, and it increases continuously up to 5.72 MHz as the luminance level increases.

In this way, a frequency component from which the beat component may be generated is extracted from the video signal. However, this frequency component includes the high frequency component of the video signal. In order to separate this high frequency component of the video signal, the variable amplitude-limiting circuit 5 is used in the preferred embodiment. Generally, the level of the high frequency component of the video signal is higher than that of the beat component. Therefore, the video information component is removed by determining the limit value of the variable amplitude-limiting circuit 5 in accordance with the level of the high frequency component of the video signal, so that the variable amplitude-limiting circuit 5 produces the saturation signal against the thus determined limit value.

On the other hand, the level of the beat component varies in accordance with the variation in the level of the sideband components of the chroma signal which are contained in the RF signal.

Figure 3:
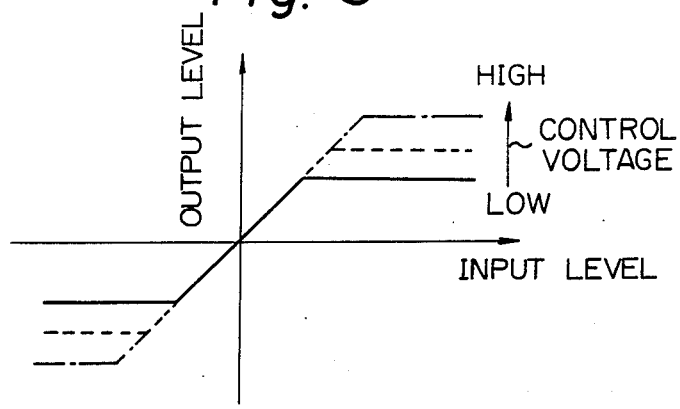
FIG. 3 is an explanatory diagram showing the characteristic of a variable amplitude-limiting circuit used in the apparatus of FIG. 1.
Figure 4:
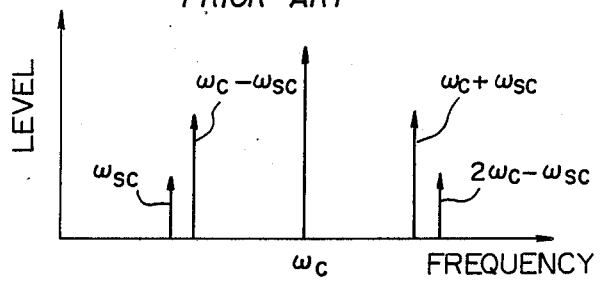
FIG. 4 is a diagram for explaining the beat component generated in an RF carrier signal.
Figure 5:
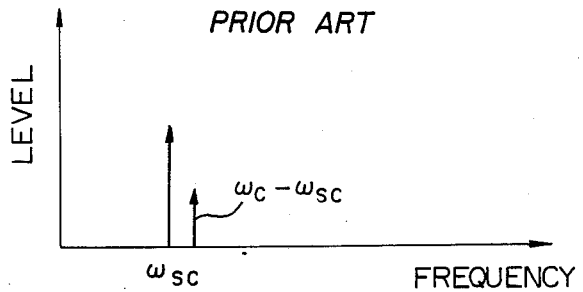
FIG. 5 is a diagram for explaining the beat signal after the demodulation.

Therefore, it is noted that the level of the chroma signal of the demodulated video signal corresponds to the level of the side-band components, and the amplitude or an average value of the above mentioned chroma signal is detected at the level detection circuit 6. By continuously controlling the amplitude-limit value of the variable amplitude-limiting circuit 5 as illustrated in FIG. 3, using the above mentioned amplitude or the average value as the control signal, the above limit value can be varied in response to variations in the level of the beat component.

With the above operation, the beat component and the video information component are separated precisely.

By subtracting the thus separated beat component from the demodulated video signal including the beat component by the subtracting circuit 4, the beat component is removed form the demodulated video signal.

In addition, the variable pass-band filter 3 used in the above embodiment can be replaced, for example, by a BPF (Band Pass Filter) having a fixed pass-band around 5 MHz. With such a construction, an effect similar to the above embodiment to some extent can be attained.

Moreover, although the saturation output level is varied continuously in the variable amplitude-limiting circuit 5 used in the above embodiment, it is also possible to employ an arrangement that the saturation output level varies stepwise. For example, the arrangement may be such that the saturation output level is made equal to 0 when the level of the chroma signal is lower than a certain constant level, so as to stop the generation of the output, and the saturation output level is made equal to a predetermined value when the level of the chroma signal is higher than the above constant level.

In this case, the operation of the apparatus is such that it outputs of the demodulated video signal as it is when the level of the chroma signal is low, and it removes the beat component from the demodulated video signal when the level of the chroma signal exceeds the above mentioned constant level.

The present invention has been described by way of an example of SLD carrying a video signal of the NTSC system as the preferred embodiment. However, the problem of the generation of a beat component (whose frequency ranges from 2.7 to 3.5 MHz) in the video signal band is also experienced with LDs of the PAL system. Therefore, the present invention can be also applied to eliminate this beat component in an LD carrying a video signal of the PAL system.

In addition to the beat component generated by the cross modulation between the main carrier signal and the subcarrier signal, a beat component can be generated in the video signal band when a PCM audio signal such as an EFM (Eight to Fourteen Modulation) signal is superimposed on the video signal. The present invention is also applicable to eliminate the beat component between the EFM signal and the chroma signal.

It is also possible to provide a dc (direct current) blocking circuit in the variable amplitude-limiting circuit 5, so that the variable amplitude-limiting circuit 5 does not produce the output signal when the beat component is not present.

With this arrangement, the operation of the apparatus is such that it eliminates the beat component from the video signal only for the frequency band of the beat component, only when the beat component is generated. Therefore, the above arrangement is advantageous in that the demodulated video signal is not degraded when the beat component is not generated and the degradation of the demodulated video signal is alleviated even though the beat component is generated.

It will be appreciated from the foregoing, according to the present invention, that apparatus for eliminating noises in a video signal is constructed to extract a frequency component, in which the beat component can be generated, from the video signal, to separate the beat component by limiting in amplitude the extracted signal, and to remove the beat component from the video signal. Thus, the noises generated by the beat component are effectively suppressed in the video signal.

What is claimed is:

1. An apparatus for suppressing noises in a reproduced color video signal having a beat component corresponding to a frequency difference between a main carrier signal and a color subcarrier signal, comprising:

signal extracting means for extracting a frequency band component of said color video signal said frequency band component including said beat component;

amplitude limiting means connected to said signal extracting means, for limiting an amplitude of an output signal of said signal extracting means; and subtracting means connected to said amplitude limiting means and receiving said color video signal, for subtracting an output signal of said amplitude limiting means from said color video signal, wherein said color video signal is a wide band color video signal having a bandwidth including the frequency of said beat component.

2. An apparatus for suppressing noises in a color video signal, comprising:

signal extracting means for extracting a frequency band component of said color video signal;

amplitude limiting means connected to said signal extracting means, for limiting an amplitude of an output signal of said signal extracting means; and subtracting means connected to said amplitude limiting means and receiving said color video signal, for subtracting an output signal of said amplitude limiting means from said color video signal, wherein said signal extracting means is adapted to determine the frequency of said frequency band component in response to a luminance signal level of said color video signal.

3. An apparatus for suppressing noises in a color video signal, comprising:

signal extracting means for extracting a frequency band component of said color video signal;

amplitude limiting means connected to said signal extracting means, for limiting an amplitude of an output signal of said signal extracting means; and subtracting means connected to said amplitude limiting means and receiving said color video signal, for subtracting an output signal of said amplitude limiting means from said color video signal, wherein said amplitude limiting means is a variable amplitude-limiting circuit adapted to determine a limit value in response to a chroma signal level of said color video signal.

4. An apparatus for suppressing noises in a video signal, comprising:

first receiving means for receiving an RF signal;

demodulating means for demodulating said RF signal into a video signal;

second receiving means for receiving said video signal and for separating a luminance signal and a chroma signal from said video signal;

extracting means coupled to said demodulating means for extracting frequency band components from said video signal in response to a luminance signal level of said luminance signal;

amplitude limiting means for limiting an amplitude of an output signal from said extracting means in response to a chroma signal level of said chroma signal; and subtracting means for subtracting an output signal of said limiting means from said video signal.

5. An apparatus as claimed in claim 1, wherein said video signal is a wide band color video signal having a spectrum whose high frequency end part can produce a beat component with a color signal component.

6. An apparatus as claimed in claim 4, wherein said extracting means is a variable pass-band filter.

* * * * *